United States Patent [19]
Celenza

[11] Patent Number: 6,163,136
[45] Date of Patent: Dec. 19, 2000

[54] TRANSISTOR DRIVEN WALL CHARGER

[75] Inventor: Nicholas Celenza, Durham, N.C.

[73] Assignee: Ericsson Inc., Research Triangle Park, N.C.

[21] Appl. No.: 09/457,110

[22] Filed: Dec. 7, 1999

[51] Int. Cl.$^7$ ...................................................... H02J 7/06
[52] U.S. Cl. ............................................ 320/164; 320/163
[58] Field of Search ................................... 320/164, 163, 320/162, 161

[56] References Cited

U.S. PATENT DOCUMENTS 4,656,411  4/1987  Carlson ................................... 320/140
5,068,570  11/1991  Oda et al. ................................. 315/128

*Primary Examiner*—Peter S. Wong
*Assistant Examiner*—Lawrence Luk
*Attorney, Agent, or Firm*—Coats & Bennett, PLLC

[57] ABSTRACT

A battery charger to recharge a battery comprises a transistor switch coupled with a cable loss compensator. Additionally, the battery charger includes a comparator, a current limiter, and a differential amplifier. The circuits are created from discrete components, and particularly include individual transistors. A smoothing network takes the signal from the switch and passes it along to the battery for recharging.

19 Claims, 3 Drawing Sheets

6,163,136

TRANSISTOR DRIVEN WALL CHARGER

FIELD OF THE INVENTION

The present invention pertains to a circuit adapted to charge a battery without the need for an expensive logic chip.

BACKGROUND OF THE INVENTION

Battery powered devices are ubiquitous in modern society. These devices include AM/FM radios, CD players, cellular phones, portable dictation machines and the like. Many of these devices include rechargeable batteries that enable the user to prolong the life of the item without having to purchase new batteries. There are several techniques by which this recharging may be accomplished. Two of the most common include conventional outlet chargers and car chargers. The outlet charger plugs into a conventional wall outlet and translates the AC voltage to a DC voltage and maximum current level suitable for the battery being recharged. Similarly, the car chargers typically plug into a cigarette lighter and convert the 12 V DC car battery voltage to a voltage of 5 V DC and current level suitable for the battery being charged.

Of particular concern are the battery chargers for cellular telephones. As the telephones become increasingly sophisticated, the phones are increasingly sensitive to electromagnetic interference or circuit damage from errant or stray signals. One of the common classes of battery chargers for cellular telephones are called switcher chargers because they use a switch to control the output voltage. In the past switcher chargers have been of constant frequency, typically around 40 kHz, to minimize the possibility of harmonics in the 430 kHz–470 kHz range from interfering with phone operations.

There are several concerns with the construction of the chargers, namely cost and size. Obviously, the charger must also have the ability to deliver power to the recharging battery in a narrow range of acceptable values. Integrated logic chips, such as the TL494, are frequently used in switcher chargers, and act as an oscillator, a pulse width modulator, an output voltage sense amplifier, and a current limiting amplifier. However, the integrated logic chips do not presently have cable loss compensation circuitry. The integrated chips provide a currently acceptable balance between cost, size and ability to perform within acceptable parameters, but there remains a need for a viable alternative which may effectuate cost savings, decrease size, and add circuitry to counteract output voltage drop due to cable loss.

SUMMARY OF THE INVENTION

An acceptable alternative to the integrated circuits of the prior art comprises constructing a battery charger out of discrete components, especially discrete transistors. The oscillator converts an incoming DC signal to a periodic sawtooth waveform. A comparator compares a reference voltage to the sawtooth voltage and generates a logic voltage to turn a switch ON and OFF. By controlling how much of each period of the sawtooth waveform the switch is on, the comparator controls the output voltage from the smoothing network.

The battery charger of the present invention also provides a cable loss compensator assembled from discrete transistors which ensures that the appropriate voltage reaches the battery to be charged despite resistive cable losses which may occur between the charger and the battery.

DETAILED DESCRIPTION OF THE PREFERRED EMBODIMENT

Figure 1:
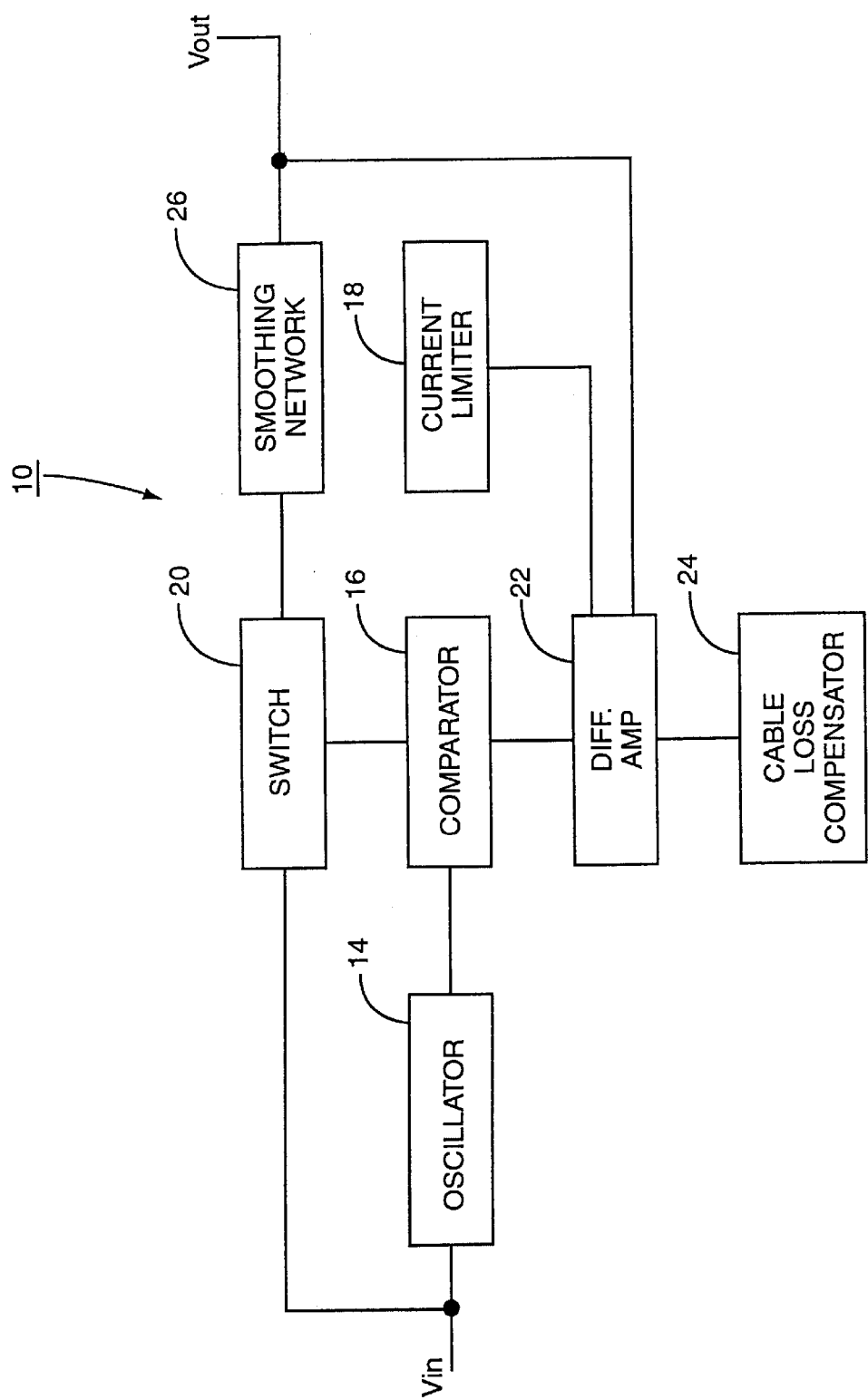
FIG. 1 pictures a block diagram of the circuit of the present invention.

Turning now to FIG. 1, the switcher battery charger circuit 10 is seen broken into a block diagram of its functional components. Specifically, the charger 10 includes an oscillator 14, a comparator 16, a current limiter 18, a switch 20, a differential amplifier 22, a cable loss compensator 24, and a smoothing network 26.

Figure 2:
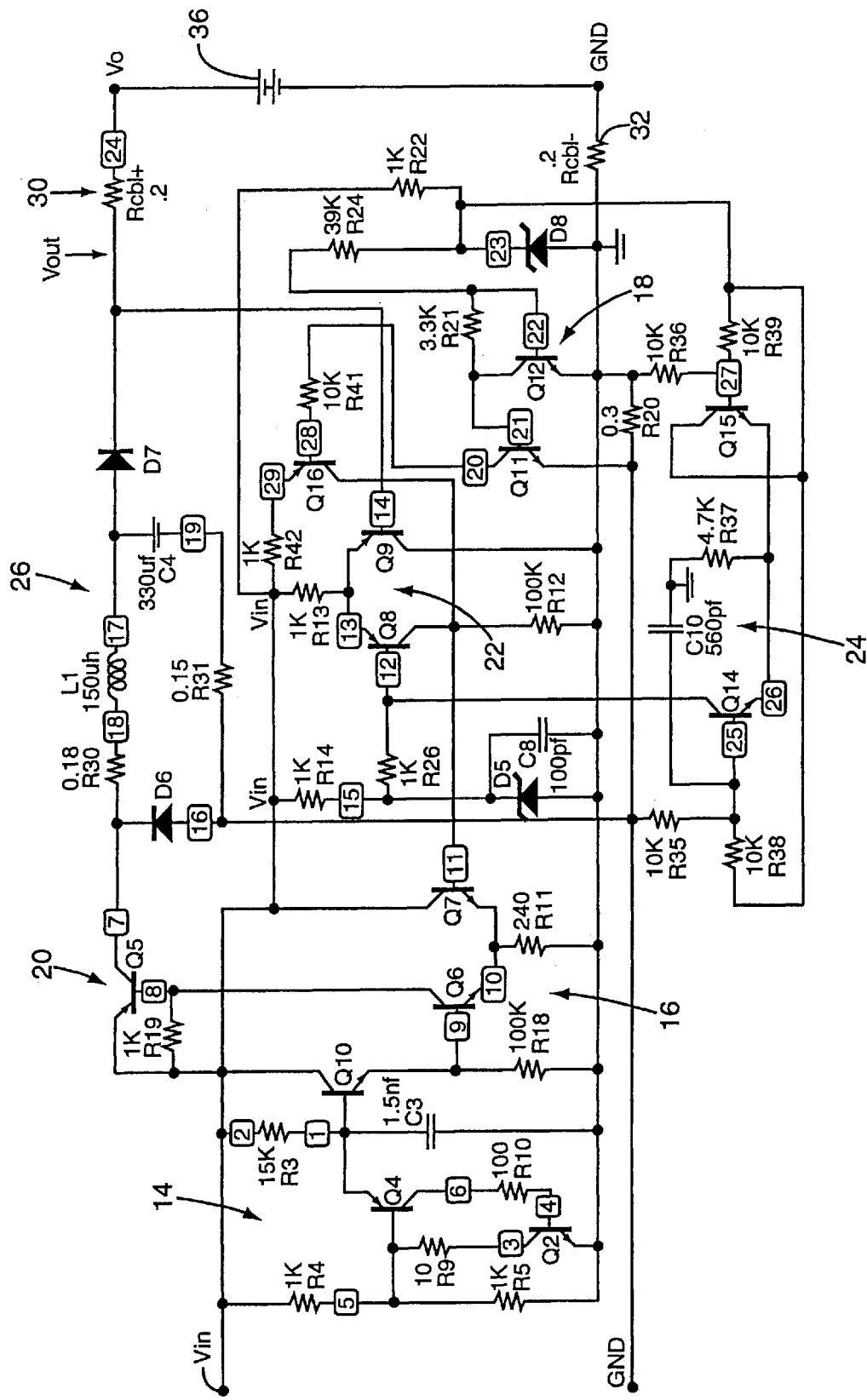
FIG. 2 shows a schematic diagram of a first embodiment of the circuit of the present invention, and FIG. 3 features a schematic diagram of a second embodiment of an alternate oscillator for the present invention.

The oscillator 14 receives an input voltage $V_{in}$ and provides a sawtooth waveform to the comparator 16. While $V_{in}$ is only labeled at one point in FIG. 1, it should be understood that $V_{in}$ may be applied to multiple components to power properly the same. $V_{in}$ is preferably a 12 V DC power source. In the event that the charger is a wall charger, a conventional isolation transformer and bridge rectifier may be used to convert AC to an acceptable DC level. The comparator 16 generates a logic voltage, which controls the turn on time of switch 20. The smoothing network 26 translates the switched $V_{in}$ into a DC output voltage $V_{out}$. The comparator 16 generates a logic voltage output dependent on the sawtooth input and the differential amplifier 22 output. Current limiter 18 affects the differential amplifier 22 output. The differential amplifier 22 output is dependent on $V_{out}$ and a reference voltage. The reference voltage is modified by the cable loss compensator 24. The switch 20 may be a BJT transistor or, for higher frequency operations, a FET. The entire circuit 10 is designed to provide an alternative to an integrated chip power supply circuit, and, as a result, is made from discrete components as better seen in FIG. 2.

Oscillator 14 is designed to take the input voltage $V_{in}$ and convert it to a periodic ramp or sawtooth waveform. The oscillator 14 comprises resistors R3, R4, R5, R9, and R10, and capacitor C3 as well as transistors Q2 and Q4. Transistor Q10 and resistor R18 serve as a current buffer for the comparator 16. R3 is a 15 kΩ resistor. R4 and R5 are 1 kΩ resistors. R9 is a 10 Ω resistor. R10 is a 100 Ω resistor and R18 is a 100 kΩ resistor. C3 is a 1.5 nF capacitor.

With $V_{in}$ present, R4 and R5 make up a reference voltage of Vin/2=V(5). R3 charges up C3 with a RC time constant type of waveform. When V(1) reaches V(5) plus a $V_{be}$ (voltage from the transistor base to the transistor emitter) drop, Q4 turns ON, which causes Q2 to turn ON. This lowers the V(5) reference voltage and discharges C3 through R9 and Q4 $V_{be}$. When V(1) reaches the lower V(5) reference voltage, Q4 turns OFF which causes Q2 to turn OFF and thus the reference voltage V(5) goes back to Vin/2. Now C3 charges up again through R3 and the oscillation continues. Q10 is used as an emitter follower stage isolating V(1) from the current load of Q6.

Comparator 16 controls the length of time the switch 20 is turned on, thereby controlling the signal sent through the switch 20 to the smoothing network 26. Comparator 16 includes transistors Q6 and Q7 with resistor R11. The comparator 16 controls the switch 20, which includes transistor Q5 and resistor R19. Resistor R11 is a 240 Ω resistor. Resistor R19 is a 1 kΩ resistor. The comparator 16 acts as a pulse width modulator stage for the sawtooth waveform produced by the oscillator 14.

V(9) is the sawtooth waveform, and V(11) is the compare voltage from the differential amplifier 22 explained below. When V(11) goes up, Q6 ON time decreases, thus the switch, particularly Q5 turns ON for a shorter amount of time. When V(11) goes down, Q6 ON time increases, thus Q5 is ON for a longer period of time.

The smoothing network 26 converts the input voltage $V_{in}$ passed through the switch 20 to a lower value DC output voltage $V_{out}$. This signal is used to charge the battery 36 through source cable 30 and return cable 32. The smoothing network 26 includes a diode D6, resistors R30 and R31, an inductor L1 and a capacitor C4. Diode D7 prevents leakage current from flowing backward through the source cable 30 thus preventing inadvertent discharge of the battery 36. Resistor R30 represents the DC resistance of L1 and is a 0.18 Ω resistor. Resistor R31, representing the equivalent series resistance of C4, is a 0.15 Ω resistor. Inductor L1 is a 150 µH inductor and capacitor C4 is a 330 µF capacitor. The operation of a smoothing network 26 is well understood, and a further discussion of it is not required.

The differential amplifier 22 provides a control voltage to the comparator 16, thereby controlling how long the switch 20 is ON, and thus how much power enters the smoothing network 26. The differential amplifier 22 comprises resistors R12, R13, and transistors Q8 and Q9. Resistor R12 is a 100 kΩ resistor. Resistor R13 is a 1 kΩ resistor.

D5 is the reference voltage that controls the output voltage $V_{out}$. Specifically, D5 is a 5 V reference. Resistor R14, a 1 kΩ resistor, biases D5 ON and capacitor C8 keeps errant noise down. C8 is a 100 pF capacitor. If $V_{out}$ falls below 5 V, Q8 turns ON less, thus V(11) goes down. This causes Q6 to turn ON for a longer amount of time, which causes Q5 to stay ON longer, in turn, increasing the average current provided to C4, which increases the voltage at $V_{out}$. When $V_{out}$ goes above 5 V, Q8 turns ON more, thus V(11) goes up. This causes Q6 to turn ON for a shorter amount of time, which causes Q5 to stay ON less, thus decreasing the average current provided to C4. This in turn lowers the voltage at $V_{out}$. This results in $V_{out}$ being regulated to V(15), the voltage of zener diode D5.

The current limiter 18 limits the current delivered to the battery 36 by monitoring the voltage across R20. When the voltage across R20 reaches $V_{be}$ of Q11 minus $V_{ce}$ of Q12, then Q11 turns ON through additional gain in Q16 increases the voltage V(11), thus turning OFF Q5. The current limiter 18 includes resistors R20, R21, R22, R24, R41, and R42 as well as a zener diode D8 and transistors Q11, Q12 and Q16. The resistor R20 is a 0.3 Ω resistor. The resistor R21 is a 3.3 kΩ resistor. The resistors R22 and R42 are 1 kΩ resistors. The resistor R24 is a 39 kΩ resistor, and the resistor R41 is a 10 kΩ resistor.

Any load current applied to output $V_o$ gets returned to the Gnd through R20. R22 and D8 make a 7.5 V reference voltage. R24 provides base current to Q12. When Q11 turns ON, Q16 turns ON, which causes V(11) to increase, which causes Q6 to turn ON less, which causes Q5 turn ON for a shorter time, thus causing $V_{out}$ to drop. This ultimately results in less current delivered.

A new function not provided by the prior art integrated circuits is that of the cable loss compensator 24. The cable loss compensator 24 detects the voltage drop caused by the source cable 30 and return cable 32 and increases the voltage V(12) to compensate for the lowering of $V_o$. The cable loss compensator 24 includes resistors R20, R35, R36, R37, R38, and R39, as well as capacitor C10 and transistors Q14 and Q15. The resistors R35, R36, R38 and R39 are all 10 kΩ resistors. The resistor R37 is a 4.7 kΩ resistor. The capacitor C10 is a 560 pF capacitor. The resistor R20, which was previously described as part of the current limiter 18, serves a dual role and also helps the cable compensator 24, and is still 0.3 Ω.

Transistors Q14 and Q15 act as a second differential amplifier. R36 and R39 set up a reference voltage of 7.5 V/2 at Q15 base. This sets up the total collector current of Q14 and Q15. If the voltage across R20 is zero, then V(25)=V(27) and $I_c$ Q14=$I_c$ of Q15. V(12) will drop from V(15) by $I_c$ of Q14*R26. Since the cable resistance of cables 30 and 32 is 0.4 Ω together typically, and we expect a load current close to 1 A, then the reference voltage V(12) must be increased by 0.4 V, to keep getting $V_{out}$=5.0 V. As $V_{out}$ load increases, V(25) will drop some, which causes Q14 to turn OFF some. This decreases the current $I_c$ flowing through the collector of the transistor Q14, which causes V(12) to increase. Note that V(12) increases as $V_{out}$ would normally decrease due to voltage drop across the resistance of cables 30 and 32. This results in $V_{out}$ staying constant with load current changes.

It should be appreciated that the values presented for the capacitors, inductor, and resistors could be varied without departing from the scope of the present invention. The present values provide a workable circuit and one which represents the best presently known mode for carrying out the invention in terms of cost, size and desired result.

Figure 3:
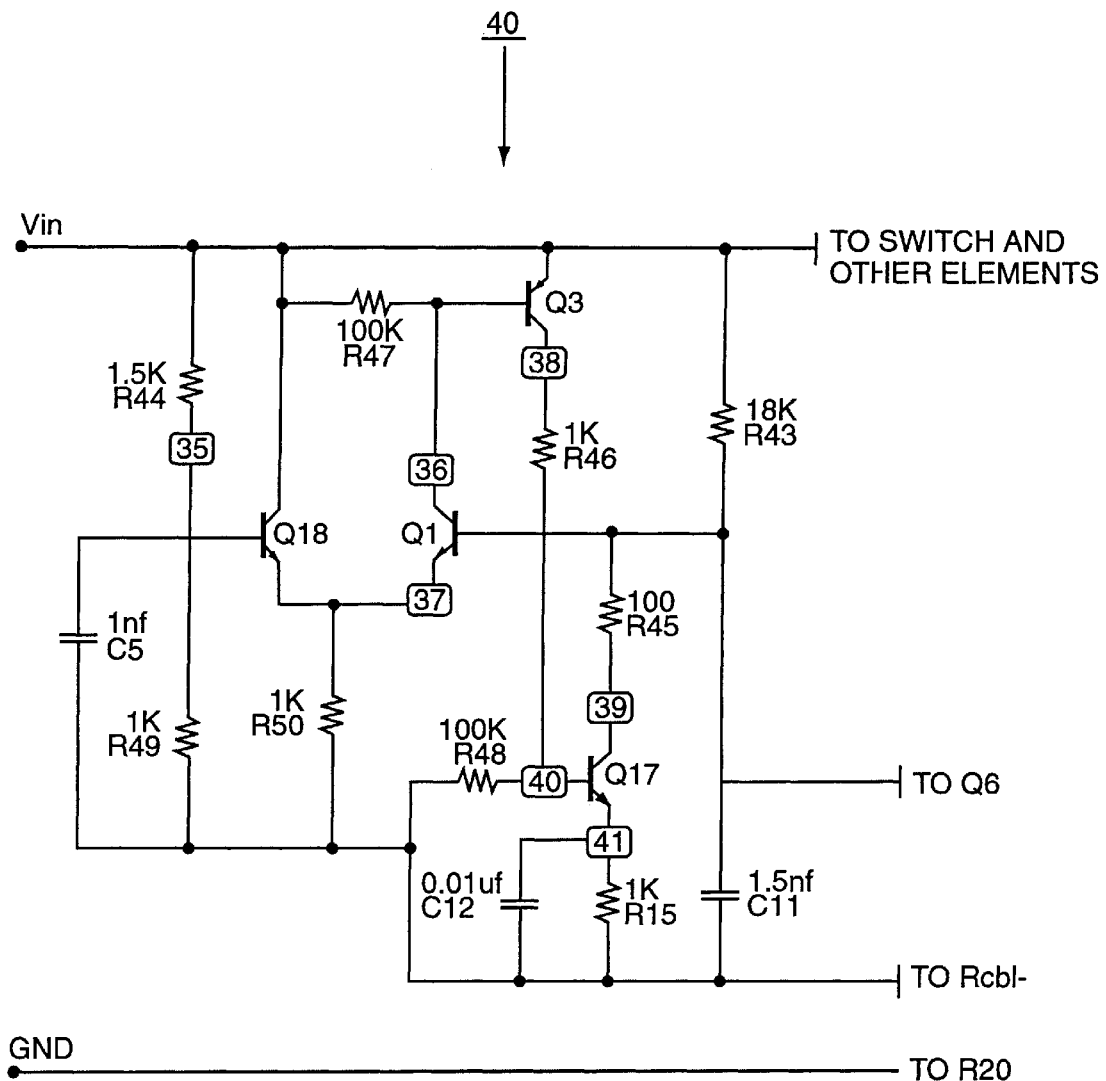

One alternative circuit, which provides a more stable oscillator 40, but at the expense of a more costly circuit is seen in FIG. 3. The oscillator 40 performs the same function as the oscillator 14, and comprises resistors R15, R43, R44, R45, R46, R47, R48, R49 and R50, transistors Q1, Q3, Q17 and Q18, and capacitors C5, C11 and C12. Resistors R15, R46, R49 and R50 are 1 kΩ resistors. Resistors R47 and R48 are 100 kΩ resistors. Resistor R45 is a 100 Ω resistor. Resistor R44 is a 1.5 kΩ resistor, and resistor R43 is an 18 kΩ resistor. Capacitor C5 is a 1 nF capacitor. Capacitor C11 is a 1.5 nF capacitor. Capacitor C12 is a 0.01 µF capacitor. As noted, this is a more stable oscillator, but it uses more transistors and costs more.

The present invention is designed to replace integrated circuit battery chargers by replacing the IC chip with a series of discrete components. It is believed that this approach may save money and provide comparable performance to any commercially available IC, while still operating within the space allowable for chargers. Furthermore, this invention provides a cable loss compensator which helps ensure that the current and voltage applied to recharge the battery are in fact within the tolerances as dictated by the battery manufacturer.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A circuit for charging a battery comprising:
   a) an oscillator for providing a periodic waveform voltage;
   b) a switch having an open state and a closed state, said switch receiving said periodic waveform and selectively passing said waveform therethrough when said switch is in said open state;

c) a converter for converting said periodic waveform to direct current for charging the battery;

d) a comparator for activating said switch;

e) a current limiter for detecting a return current from the battery, wherein said current limiter controls said comparator to turn off said switch if a return current is detected;

f) a first differential amplifier for determining whether a supply voltage charging the battery drops below a threshold, wherein said differential amplifier controls said comparator to turn on said switch when said voltage supplied to charge the battery drops below the threshold; and g) a cable loss compensator for controlling said differential amplifier.

2. The circuit of claim 1 wherein said periodic waveform is a sawtooth waveform.

3. The circuit of claim 1 wherein said switch is a transistor.

4. The circuit of claim 3 wherein said transistor is a BJT.

5. The circuit of claim 3 wherein said transistor is a FET.

6. The circuit of claim 1 wherein said oscillator comprises pair of transistors which convert an incoming DC signal to a sawtooth waveform.

7. The circuit of claim 1 wherein said cable loss circuit comprises a pair of transistors which together form a second differential amplifier.

8. A battery charger comprising:

a) a transistor switch having an input, an output, an off (reverse biased) state in which nothing passes from the input to the output, and an on (forward biased) state in which a signal applied to the input passes from the output;

b) a oscillator formed from a plurality of transistors, said oscillator generating a periodic waveform and passing the same to the input of said switch;

c) a comparator for activating said switch; and d) a converter coupled to the output of said switch for converting the periodic waveform to a direct current signal;

e) wherein the time average of the output of the switch equals the direct current signal produced by the converter.

9. The battery charger of claim 8 wherein said switch is a transistor.

10. The battery charger of claim 9 wherein said transistor is a BJT.

11. A battery charger comprising:

a) an oscillator for providing a periodic waveform voltage;

b) a switch having an open state and a closed state, said switch receiving said periodic waveform and selectively passing said waveform therethrough when said switch is in said open state;

c) a converter for converting said periodic waveform to direct current for charging a battery;

d) a comparator for activating said switch;

e) a differential amplifier for determining whether a supply voltage charging the battery drops below a threshold, wherein said differential amplifier controls said comparator to turn on said switch when said voltage supplied to charge the battery drops below the threshold; and f) a cable loss compensator for controlling said differential amplifier.

12. The battery charger of claim 11 wherein said cable loss compensator comprises a) a resistor; and b) a pair of transistors operatively connected to said resistor;

c) wherein when current flows across said resistor, one of said transistors turns off to trigger said differential amplifier.

13. A method of charging a battery:

a) generating a periodic waveform;

b) applying said periodic waveform to the input of a switch that is selectively controlled to produce a modulated waveform at its output;

c) converting said modulated output from said switch to generate a dc output current at an output;

d) applying said dc output current to a battery to charge said battery;

e) generating an output voltage at said output;

f) generating a compare voltage as a function of the output voltage and a reference voltage; and g) comparing the compare voltage to a second reference voltage to generate a control signal for controlling said switch.

14. The method of claim 13 wherein generating a periodic waveform comprises generating a sawtooth waveform.

15. The method of claim 13 further comprising the step of charging a battery through a cable.

16. The method of claim 15 further comprising the step of compensating for a resistive loss in said cable.

17. The method of claim 13 wherein applying a periodic waveform to the input of a switch comprises applying a periodic waveform to the input of a transistor.

18. The method of claim 13 wherein applying a periodic waveform to the input of a switch comprises applying a periodic waveform to the input of a BJT.

19. The method of claim 13 wherein applying a periodic waveform to the input of a switch comprises applying a periodic waveform to the input of a FET.

* * * * *